United States Patent
Moran, Jr.

(10) Patent No.: US 10,818,280 B2
(45) Date of Patent: Oct. 27, 2020

(54) ELECTRONIC DEVICE STORAGE CONTAINER

(71) Applicant: David Everhart Moran, Jr., Newtown Square, PA (US)

(72) Inventor: David Everhart Moran, Jr., Newtown Square, PA (US)

(*) Notice: Subject to any disclaimer, the term of this patent is extended or adjusted under 35 U.S.C. 154(b) by 0 days.

(21) Appl. No.: 16/685,313

(22) Filed: Nov. 15, 2019

(65) Prior Publication Data

US 2020/0090634 A1    Mar. 19, 2020

Related U.S. Application Data

(63) Continuation-in-part of application No. 15/728,680, filed on Oct. 10, 2017, now abandoned.

(60) Provisional application No. 62/461,315, filed on Feb. 21, 2017.

(51) Int. Cl.
| | |
|---|---|
| G10K 11/175 | (2006.01) |
| B65D 43/16 | (2006.01) |
| G06F 3/16 | (2006.01) |
| H04R 1/02 | (2006.01) |
| H04W 12/02 | (2009.01) |

(52) U.S. Cl.
CPC .......... *G10K 11/175* (2013.01); *B65D 43/163* (2013.01); *G06F 3/165* (2013.01); *H04R 1/025* (2013.01); *H04W 12/02* (2013.01)

(58) Field of Classification Search
CPC ..... G10K 11/175; B65D 43/163; G06F 3/165; H04R 1/025; H04W 12/02
USPC ............................................... 381/73.1
See application file for complete search history.

(56) References Cited

U.S. PATENT DOCUMENTS

| | | |
|---|---|---|
| 3,963,883 A | 6/1976 | Kulka |
| 8,203,850 B2 | 6/2012 | Bouza et al. |
| 8,699,235 B2 | 4/2014 | Soufan |
| 8,718,729 B1 | 5/2014 | Kershenstein |
| 9,336,768 B2 | 5/2016 | Soufan et al. |
| 9,747,884 B2 | 8/2017 | Lehmann |
| 9,750,167 B2 | 8/2017 | Nash |
| 9,979,427 B2 | 5/2018 | Thomas et al. |
| 10,083,000 B2 | 9/2018 | Gavin et al. |

(Continued)

*Primary Examiner* — Paul Kim
*Assistant Examiner* — Douglas J Suthers
(74) *Attorney, Agent, or Firm* — Boudwin Intellectual Property; Daniel Boudwin

(57) ABSTRACT

The present invention provides an electronic device storage container for preventing unauthorized eavesdropping by an electronic device that includes active listening capabilities. The electronic device storage container includes a base, perimeter sidewalls extending upwardly therefrom to form an interior volume, and a lid hingedly affixed to one sidewall. An electronics housing is disposed within the interior volume and includes a power source operably connected to a white noise generator, a photosensor, a plurality of USB ports, an internal speaker, an external speaker, a fan, a volume control, a lid interlock switch, and one or more exterior LEDs. The housing may include layers of soundproofing material. The white noise generator emits a sound signal to prevent the microphone of the stored electronic device from recording conversations or other sounds. The photosensor detects when the electronic device receives an incoming transmission, and the external speaker notifies the user of the incoming transmission.

14 Claims, 6 Drawing Sheets

(56) References Cited

U.S. PATENT DOCUMENTS

| | | |
|---|---|---|
| 2005/0092504 A1 | 5/2005 | Walthall et al. |
| 2008/0317265 A1* | 12/2008 | Bouza, II ................ H04K 3/28 |
| | | 381/177 |
| 2009/0312000 A1 | 12/2009 | Wakefield et al. |
| 2010/0230018 A1 | 9/2010 | Nielsen |
| 2011/0011760 A1* | 1/2011 | Habersetzer .......... G06F 1/1628 |
| | | 206/320 |
| 2011/0014863 A1 | 1/2011 | Foster |
| 2011/0294470 A1 | 12/2011 | Pasquero et al. |
| 2014/0024347 A1 | 1/2014 | Carter |
| 2014/0161273 A1* | 6/2014 | Soufan ................... H04M 1/19 |
| | | 381/73.1 |
| 2015/0089590 A1 | 3/2015 | Krishnan et al. |
| 2016/0044841 A1 | 2/2016 | Chamberlain |
| 2018/0277086 A1 | 9/2018 | Soffer |

* cited by examiner

ELECTRONIC DEVICE STORAGE CONTAINER

CROSS REFERENCE TO RELATED APPLICATIONS

This application is a continuation-in-part of U.S. patent application Ser. No. 15/728,680, filed on Oct. 10, 2017, which claims the benefit of U.S. Provisional Application No. 62/461,315 filed on Feb. 21, 2017. The above identified patent applications are herein incorporated by reference in their entirety to provide continuity of disclosure.

BACKGROUND OF THE INVENTION

The present invention relates to electronic device storage containers. More specifically, the present invention provides an electronic device storage container that emits a white noise signal in order to prevent eavesdropping on verbal communications by an unauthorized intruder or by an electronic device that includes active listening capabilities.

Most modern electronic devices are constantly linked to the internet through a wireless network such as a mobile network or a Wi-Fi connection. A constant internet connection leaves such electronic devices susceptible to hacking or other access attempts by unauthorized intruders. Specifically, mobile devices such as smartphones are often targeted by hackers to eavesdrop on confidential conversations. Many times, a hacked smartphone will go unnoticed, and confidential information may be acquired and leaked by the hacker. This confidential information may include sensitive topics such as trade secrets, stock information, bank account information, personal identifying information, or other information that an individual would wish to keep private.

In addition to hacking concerns, many modern electronic devices such as smartphones, tablets, and the like include microphones that have active listening capabilities. The active listening capabilities typically cause the electronic device to monitor for a particular word that activates additional functions of the device and primes it to receive a voice input. While not always advertised to consumers, some of these active listening capabilities cause microphones to constantly pick up audio signals from their surroundings, regardless of whether the electronic device is currently in use. The active listening mechanism can recognize particular words and phrases, and use that information to alter advertising content displayed on the device. Regardless of the use of the information or the intentions of those recording it, many individuals would prefer if their private conversations were not constantly monitored and potentially stored. Therefore, it is desirable to provide an electronic device storage container that generates a white noise signal to mask other incoming sounds and prevent the stored electronic device's microphone from actively monitoring private conversations or any other verbal communications.

Devices have been disclosed in the known art that relate to electronic device storage containers. These include devices that have been patented and published in patent application publications. However, the devices in the known art have several drawbacks. For example, some known art devices provide electronic device storage boxes that prevent magnetic fields from effecting a mobile device by blocking wireless signals. This is undesirable for most individuals, as it leaves their mobile device unable to receive potentially important incoming transmissions. Further, some of electronic device storage boxes in the known art require the stored electronic device to be completely deactivated, which also prevents the user from receiving any type of incoming communication on the electronic device. Moreover, these types of containers do not include a way to notify a user that an electronic device inside the container is receiving a phone call, text message, or other incoming communication. While some storage containers exist that generate noise to block stored electronic devices from recording, they include other drawbacks, such as a lack of a photosensor, which more accurately detects when an incoming transmission is received by the stored electronic device. Additionally, the storage boxes and containers in the known art fail to include a fan and airflow openings for preventing overheating of any stored electronic devices. The devices in the known art also fail to provide a mechanism for charging the batteries of the stored electronic devices.

In light of the devices disclosed in the known art, it is submitted that the present invention substantially diverges in design elements from the known art and consequently it is clear that there is a need in the art for an improvement to existing electronic device storage containers. In this regard the instant invention substantially fulfills these needs.

SUMMARY OF THE INVENTION

In view of the foregoing disadvantages inherent in the known types of electronic device storage containers now present in the known art, the present invention provides a new electronic device storage container wherein the same can be utilized for preventing a hacked smartphone or an electronic device having active listening capabilities from being eavesdropping on a confidential conversation or other verbal communication.

It is therefore an object of the present invention to provide a new and improved electronic device storage container that has all of the advantages of the known art and none of the disadvantages.

It is another object of the present invention to provide an electronic device storage container comprising a base, a perimeter sidewall forming an interior volume, and a lid hingedly affixed to one of the perimeter sidewalls. The interior volume may further include one or more layers of soundproofing material, an interior speaker operably connected to a white noise generator, a sensor configured to detect when a stored electronic device in the interior volume receives an incoming transmission, and an external speaker configured to emit an audible alert when the sensor detects an incoming transmission.

Another object of the present invention is to provide an electronic device storage container including one or more USB ports that are operably connected to a power source for charging the batteries of a stored electronic device.

Yet another object of the present invention is to provide an electronic device storage container including at least one external LED.

Another object of the present invention is to provide an electronic device storage container that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
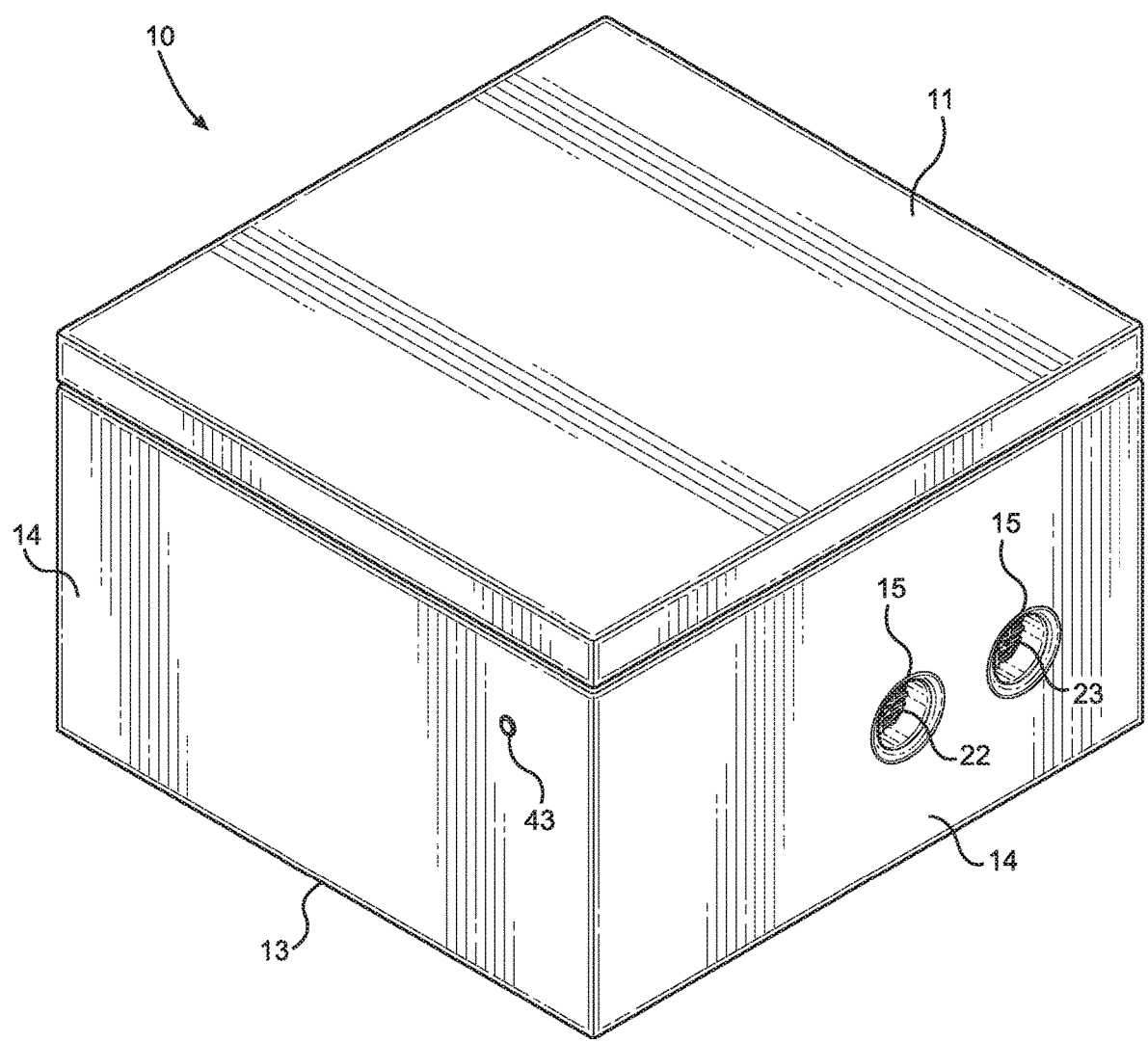
FIG. 1 shows a perspective view of an embodiment of the electronic device storage container with the lid closed.

Reference is made herein to the attached drawings. Like reference numerals are used throughout the drawings to depict like or similar elements of the electronic device storage container. For the purposes of presenting a brief and clear description of the present invention, the preferred embodiment will be discussed as used for generating a white noise signal that prevents a hacked device or a device with active listening capabilities from monitoring verbal communications or other sounds. The figures are intended for representative purposes only and should not be considered to be limiting in any respect.

Referring now to FIG. 1, there is shown a perspective view of an embodiment of the electronic device storage container with the lid closed. The electronic device storage container 10 includes a base 13, a plurality of sidewalls 14 extending upwardly therefrom forming an interior volume (visible in FIG. 2), and a lid 11 pivotally affixed to one of the sidewalls 14. A pair of openings 15 are disposed on one of the sidewalls 14. One opening 15 includes a fan 22, while the other opening 15 includes an external speaker 23. Further, a status LED 43 is disposed on one of the sidewalls 14. The status LED 43 can be utilized to show a number of status indications. In one embodiment, the status LED 43 illuminates when the lid 11 is closed, indicating that the white noise generator (visible in FIG. 2) and the fan 22 are currently operational. While the electronic device storage container 10 is shown as being rectangular in shape, the container 10 is not limited to this specific shape and can include any desired dimensions or shape.

Figure 2:
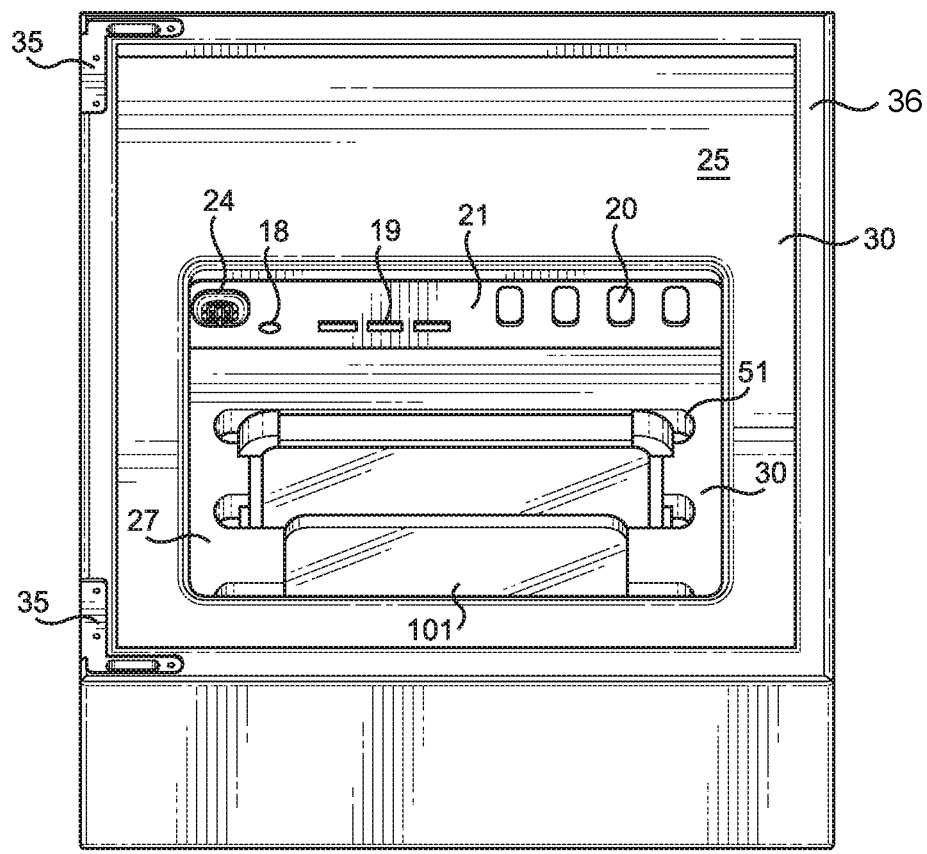
FIG. 2 shows a perspective view of the interior of an embodiment of the electronic storage container with the lid removed for visibility.

Referring now to FIG. 2, there is shown a perspective view of the interior of an embodiment of the electronic storage container with the lid removed for visibility. The electronic device storage container includes an interior volume 27 for storing one or more electronic devices 101. An electronics housing 21 is positioned adjacent the interior volume 27 and includes the electronic components of the electronic device storage container. The electronics housing includes an interior speaker 24 operably connected to a white noise generator (not visible, shown in diagram form in FIG. 7), a sensor 18 configured to detect when an electronic device 101 stored within the interior volume 27 receives an incoming transmission, and one or more USB ports 19. The interior speaker 24 emits the noise generated by the white noise generator to prevent a stored electronic device from recording verbal communications or other sounds.

The electronics housing 21 also includes a plurality of vents 20 that allows air to be expelled out of the interior volume 27 via the fan. This allows the fan to cool the interior volume 27, thus preventing any electronic devices 101 stored therein from overheating. In the illustrated embodiment, the sensor 18 comprises a photosensor that is configured to detect an increase of the light level within the interior volume 27, which increases in brightness when an electronic device 101 illuminates upon receiving an incoming transmission.

The electronic device storage container further includes one or more layers of soundproofing material 30. The soundproofing material 30 is configured to prevent the white noise emitted through the internal speaker 24 from being heard from the container exterior. The soundproofing material 30 also acts to reduce the transmission of external sounds into the interior volume 27, thereby further preventing an electronic device 101 from picking up external sounds in conjunction with the white noise generator. In the shown embodiment, the shape of the interior volume 27 is defined by the arrangement and positioning of the layers of soundproofing material 30. The soundproofing material 30 includes one or more channels 51 that can removably receive an electronic device 101 therein, such that it is safely supported when stored.

Further, in the shown embodiment, one of the layers of soundproofing material 30 includes a recessed upper surface 25 positioned below the upper edge 36 of the container, which provides an area for a layer of soundproofing material 30 on the lid to occupy when the lid is closed. When the lid is in a closed position, the lid soundproofing material and the container soundproofing material meet, such that each layer rests flush against one another. In this way, a substantially soundproof barrier is created, which prevents any sound from entering into or exiting from the interior volume 27. In the shown embodiment, the upper edge 36 of the container includes hinge recesses 35 for receiving sector hinges that secure the lid to the container. The container itself is constructed of a rigid material, such as wood for example, in order to maintain the structure of the container while further providing an additional sound barrier.

Figure 3:
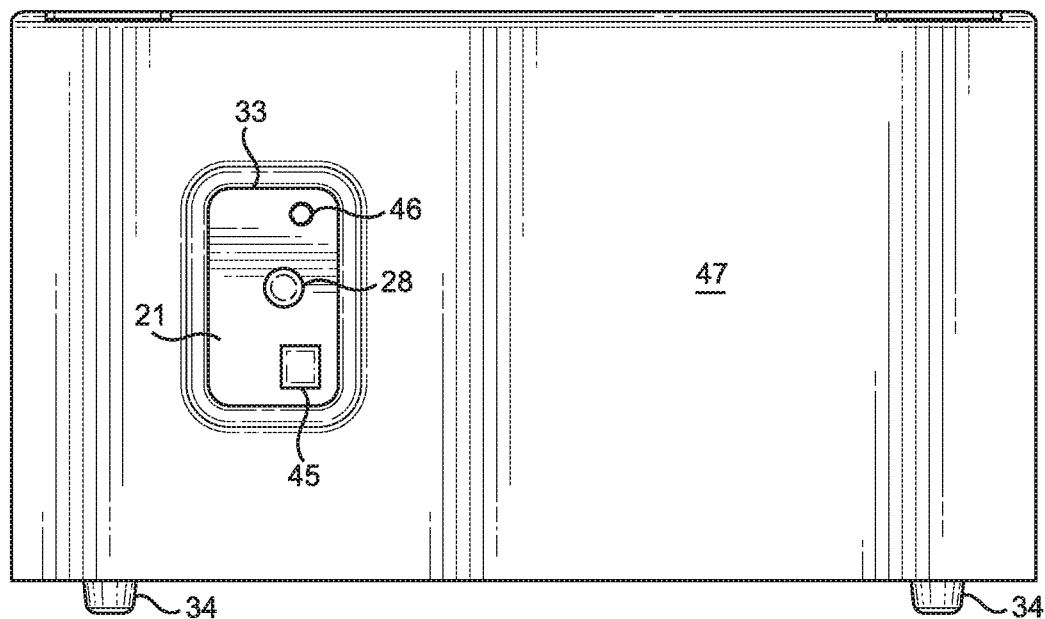
FIG. 3 shows a rear elevation view of an embodiment of the electronic device storage container.

Referring now to FIG. 3, there is shown a rear elevation view of an embodiment of the electronic device storage container. In the shown embodiment, the rear face 47 of the container includes an opening 33 which exposes a portion of the electronics housing 21 to the container exterior. The exposed portion of the electronics housing 21 includes a power source connector 45, which is utilized to electrically connect the electronic components of the container to a power source, such as a wall outlet, for example. The exposed portion of the electronics housing 21 also includes a volume control knob 28 for controlling the volume of the external speaker. Further, the exposed portion of the electronics housing 21 includes a power LED 46 which indicates when the container is currently connected to a power source via the connector 45. Additionally, the illustrated embodiment of the container includes a plurality of support legs 34, which may include rubber or similar high friction materials to prevent the container from sliding or slipping on its support surface.

Figure 4:
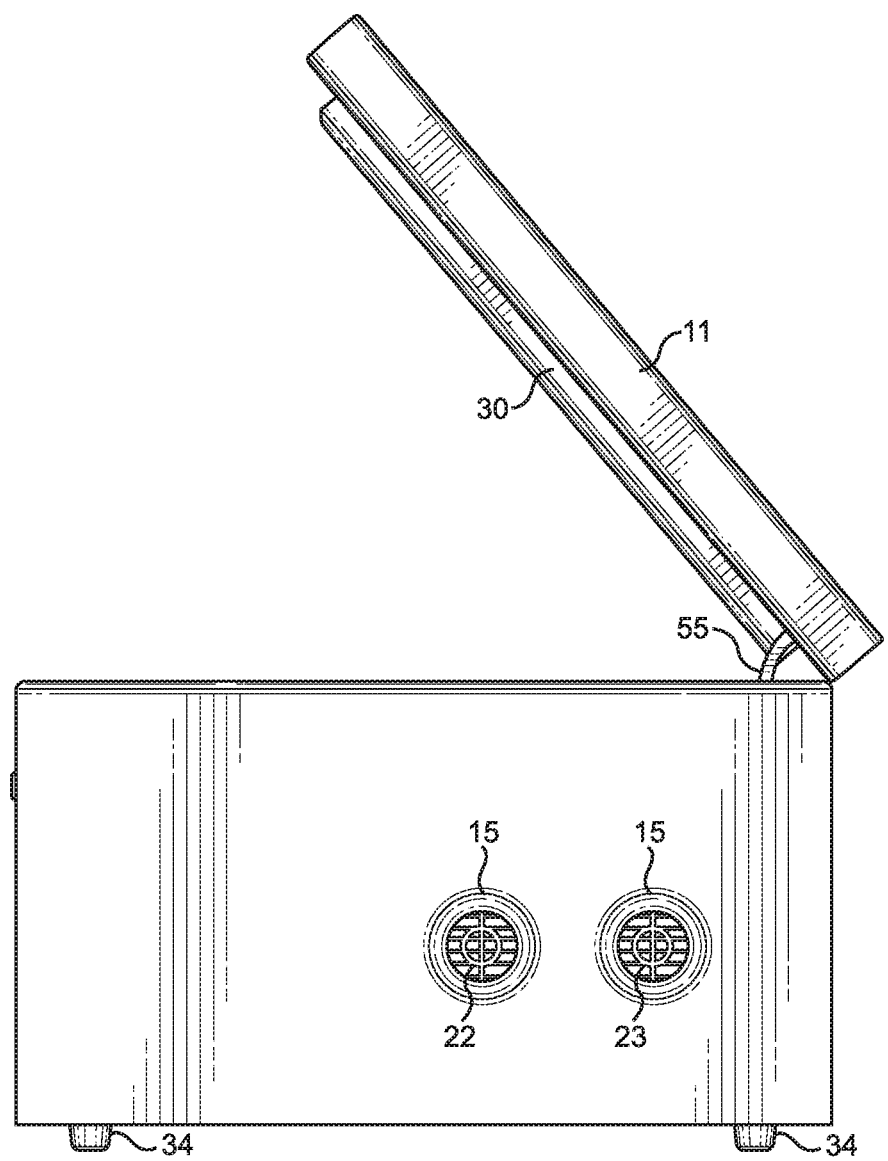
FIG. 4 shows a side elevation view of an embodiment of the electronic device storage container with the lid in an open position.
Figure 5:
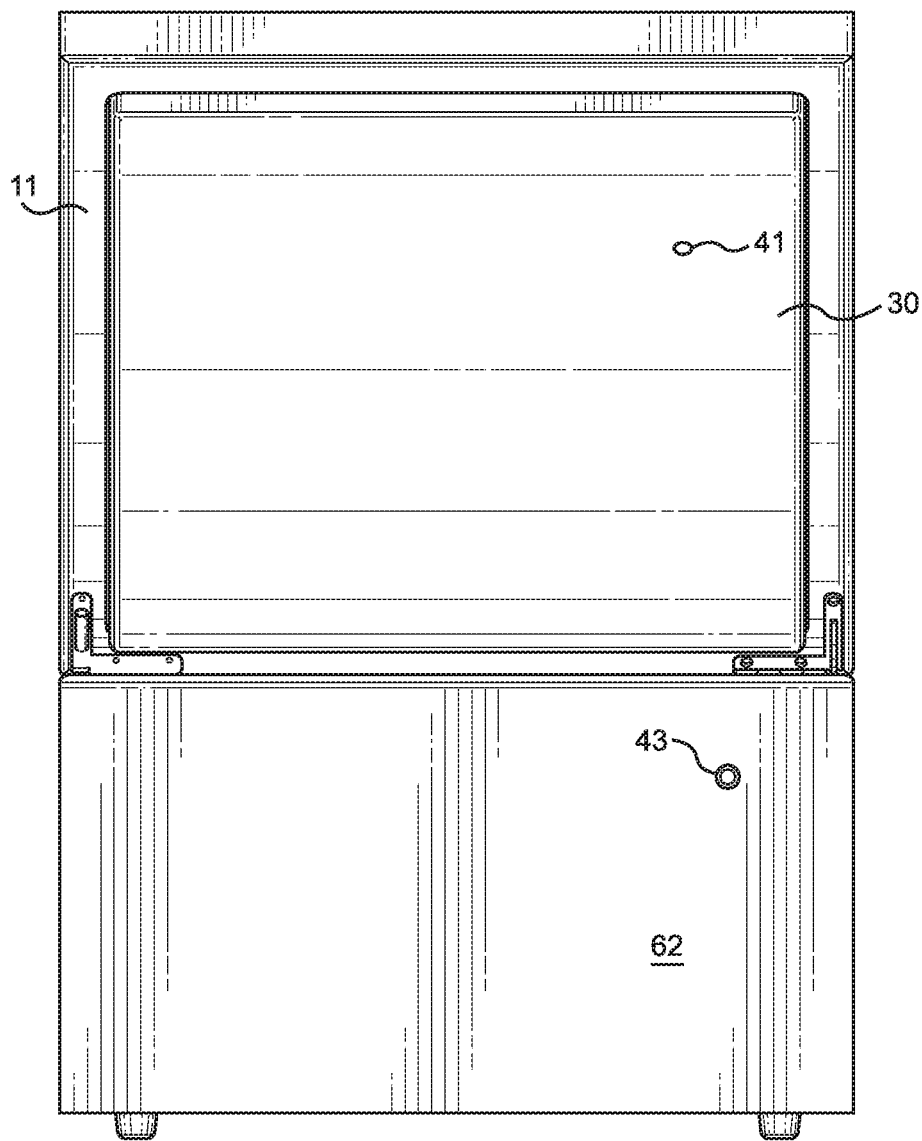
FIG. 5 shows a front elevation view of an embodiment of the electronic device storage container with the lid in an open position.

Referring now to FIGS. 4 and 5, there is shown a side elevation view of an embodiment of the electronic device storage container with the lid in an open position, and a front elevation view of an embodiment of the electronic device storage container with the lid in an open position, respectively. In the shown embodiment, the lid 11 includes its own layer of soundproofing material 30. An interlock switch 41 extends through the soundproofing material 30 on the lid 11 and is configured to activate both the white noise generator and the fan when the lid 11 is in a closed position. In the shown embodiment, the status LED 43 disposed on the front face 62 of the container is configured to illuminate when the interlock switch 41 is depressed by the lid being closed, thereby indicating the that fan and white noise generator are currently active. Further, in the shown embodiment, the lid 11 is pivotally connected to the container via a pair of sector hinges 55. However, other types of hinges or other connections may be utilized to achieve a pivotal relationship between the lid and the container. In other embodiments, the lid 11 may be completely disconnected and removably from the container.

Figure 6:
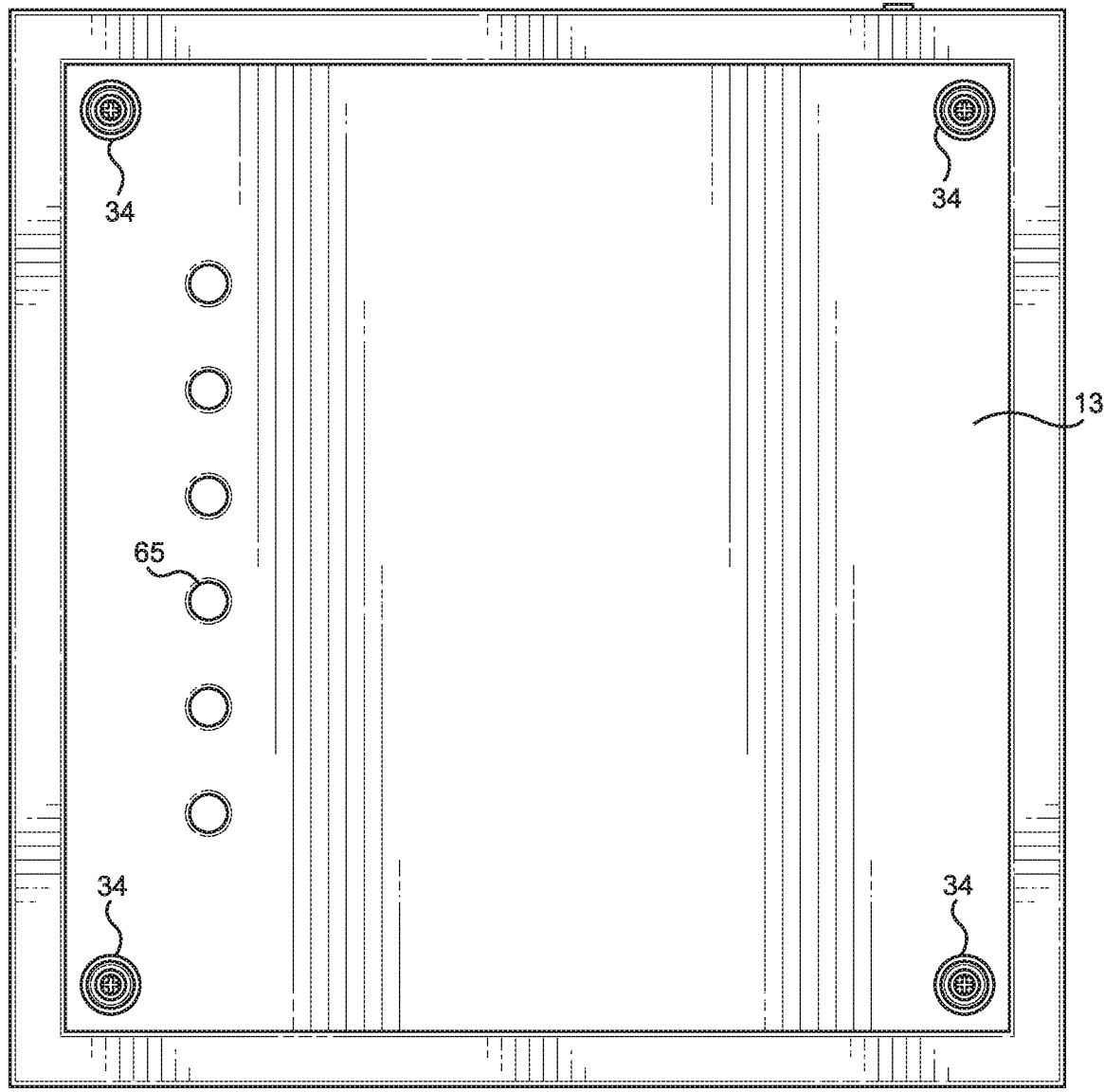
FIG. 6 shows a bottom plan view of an embodiment of the electronic device storage container.

Referring now to FIG. 6, there is shown a bottom plan view of an embodiment of the electronic device storage container. The base 13 of the container includes one or more airflow openings 65 that allow cool air to flow into the interior volume of the container as the fan expels the warm air from the interior volume of the container. The illustrated embodiment shows a linear arrangement of a plurality of circular airflow openings 65, but the airflow openings 65 are not limited to any particular shape, number, or arrangement. Further, the shown embodiment includes four support legs 34 disposed on the corners of the base 13, but other embodiments may include different amounts and arrangements of support legs 34, including an embodiment having no support legs 34.

Figure 7:
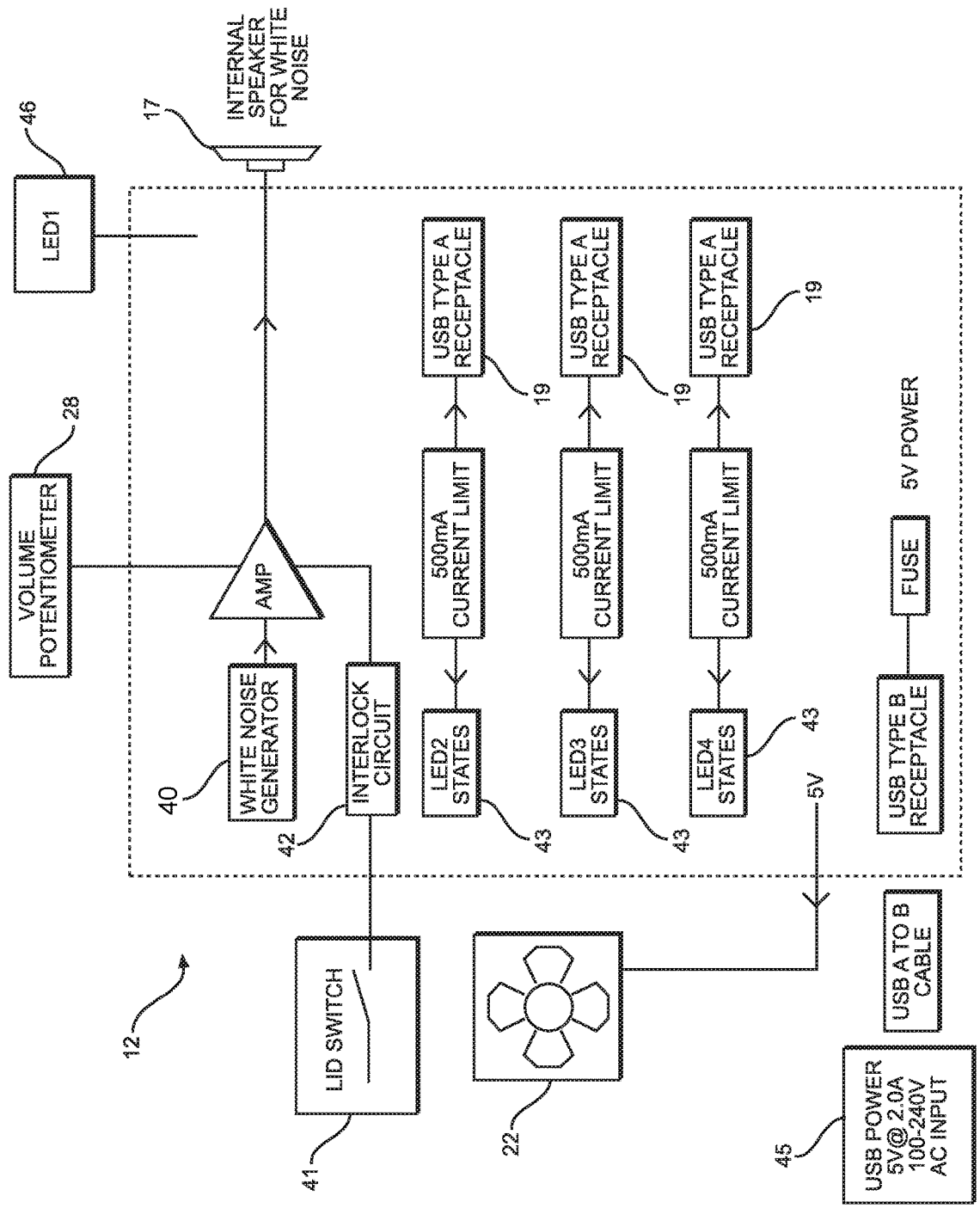
FIG. 7 shows a block diagram of the components of an embodiment of the electronic device storage container.

Referring now to FIG. 7, there is shown a block diagram of the components of an embodiment of the electronic device storage container. In the shown embodiment, the container 12 includes an interlock circuit 42 operably connected to a lid interlock switch 41, which is configured to activate the white noise generator 40 and the fan 22 when the lid is in a closed position. In some embodiments, the container 12 includes one or more additional status LEDs 43 that are operably connected to internal USB ports 19. The USB ports 19 are operably connected to the power source connection 45, such that an electronic device can be connected to the USB ports 19 to charge the battery of the electronic device. The external status LEDs 43 can be configured to illuminate to indicate the connected or charging status of an electronic device that is connected to the internal USB ports 19.

In some embodiments, the external status LEDs 43 can be configured to illuminate when the electronic device stored with the container 12 receives an incoming transmission. The container 12 further includes at least one external power status LED 46 that is configured to illuminate when the power source connector 45 is receiving electrical power. The volume of the external speaker (not shown in diagram) can be adjusted in volume via the volume potentiometer 28. The volume of the internal white noise speaker 17 is set to a particular level that is optimized to cancel out any incoming sound that would be recorded, which prevents the microphone of the stored electronic device from picking up verbal communications or other sounds.

In operation, a user can store as many electronic devices as desired within the interior volume of the container 12. The external speaker allows a user to be notified via an audible alert if the electronic device receives a text, phone call, or any other type of incoming transmission. This operation is performed by utilizing the photosensor within the interior of the container 11. A typical smartphone or other similar device will automatically illuminate upon receiving an incoming transmission. The photosensor detects this illumination, which causes the external speaker to emit an audible alert. This allows a user to maintain the ability to be notified if a phone call or text is received, while the constant emission of white noise continuously prevents any eavesdropping on verbal communications or other sounds.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device storage container, comprising:
  a base, perimeter sidewalls extending upwardly from the base forming an interior volume, and
  a lid hingedly affixed to one of the perimeter sidewalls;
  a power source;
  a fan;
  a photosensor configured to detect illumination of an electronic device stored within the interior volume;
  a white noise generator operably connected to an interior speaker disposed within the interior volume; and
  an external speaker disposed within an opening in one of the perimeter sidewalls and configured to emit an audible alert when the photosensor detects that a stored electronic device is illuminated.

2. The electronic device storage container of claim 1, further comprising at least one USB port disposed within the interior volume of the housing and operably connected to the power source.

3. The electronic device storage container of claim 1, wherein the power source comprises a power source connector configured to connect to a wall outlet.

4. The electronic device storage container of claim 1, further comprising a power switch configured to selectively activate or deactivate the white noise generator.

5. The electronic device storage container of claim 4, wherein the power switch comprises an interlock switch operably connected to the lid, the white noise generator, and the fan, wherein the interlock switch is configured to activate the white noise generator and the fan when the lid is in a closed position, and is further configured to deactivate the white noise generator and the fan when the lid is in an open position.

6. The electronic device storage container of claim 1, further comprising a volume control configured to selectively raise or lower the volume of the external speaker.

7. The electronic device storage container of claim 1, further comprising one or more exterior LEDs that are configured to illuminate when the photosensor detects that a stored electronic device is illuminated.

8. The electronic device storage container of claim 1, further comprising one or more layers of soundproofing material disposed within the interior volume.

9. An electronic device storage container, comprising:
a base, perimeter sidewalls extending upwardly from the base forming an interior volume, and a lid hingedly affixed to one of the perimeter sidewalls; and
an electronics housing comprising:
  a power source;
  one or more USB ports;
  a photosensor configured to detect illumination of an electronic device stored within the interior volume;
  a white noise generator;
  a fan configured to expel a volume of air from the interior volume;
  an interior speaker;
  an external speaker disposed within an opening in one of the perimeter sidewalls and configured to emit an audible alert when the photosensor detects that a stored electronic device is illuminated;
  a volume control operably connected to the exterior speaker; and
  one or more exterior LEDs.

10. The electronic device storage container of claim 9, wherein the electronics housing further comprises one or more interior vents configured to allow a volume of air to be expelled from the interior volume of the container to an exterior of the container via the fan.

11. The electronic device storage container of claim 9, further comprising a power switch configured to selectively activate or deactivate the white noise generator.

12. The electronic device storage container of claim 11, wherein the power switch comprises an interlock switch operably connected to the lid, the white noise generator, and the fan, wherein the interlock switch is configured to activate the white noise generator and the fan when the lid is in a closed position, and is further configured to deactivate the white noise generator and the fan when the lid is in an open position.

13. The electronic device storage container of claim 9, further comprising one or more layers of soundproofing material disposed within the interior volume.

14. The electronic device storage container of claim 9, wherein the power source comprises a power source connector configured to connect to a wall outlet.

* * * * *